US010214211B2

(12) United States Patent  
Kobayashi et al.

(10) Patent No.: US 10,214,211 B2  
(45) Date of Patent: Feb. 26, 2019

(54) DRIVE CONTROL APPARATUS

(71) Applicant: HONDA MOTOR CO., LTD., Tokyo (JP)

(72) Inventors: Sachio Kobayashi, Wako (JP); Mahito Ishiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

(21) Appl. No.: 15/257,087

(22) Filed: Sep. 6, 2016

(65) Prior Publication Data

US 2017/0066443 A1 Mar. 9, 2017

(30) Foreign Application Priority Data

Sep. 7, 2015 (JP) .................................. 2015-175810

(51) Int. Cl.  
*B60W 30/16* (2012.01)

(52) U.S. Cl.  
CPC ......... *B60W 30/16* (2013.01); *B60W 2520/10* (2013.01); *B60W 2550/141* (2013.01); *B60W 2550/308* (2013.01); *B60W 2720/106* (2013.01); *B60W 2750/308* (2013.01)

(58) Field of Classification Search  
None  
See application file for complete search history.

(56) References Cited

U.S. PATENT DOCUMENTS

| 2004/0061626 A1* | 4/2004 | Kubota | B60K 31/0008 701/96 |
| 2007/0213916 A1* | 9/2007 | Sugano | B60W 30/16 701/96 |
| 2009/0204304 A1* | 8/2009 | Urban | B60W 30/14 701/96 |
| 2011/0087415 A1* | 4/2011 | Yokoyama | B60T 7/22 701/71 |

(Continued)

FOREIGN PATENT DOCUMENTS

| JP | 6-129274 A | 5/1994 |
| JP | 2004-122823 A | 4/2004 |

(Continued)

OTHER PUBLICATIONS

Japanese Office Action dated Sep. 11, 2018, issued in counterpart Japanese Patent Application No. 2015-175810 with English translation. (6 pages).

*Primary Examiner* — Nicholas K Wiltey  
(74) *Attorney, Agent, or Firm* — Westerman, Hattori, Daniels & Adrian, LLP

(57) ABSTRACT

A drive control apparatus includes: an inter-vehicle distance sensor configured to detect an inter-vehicle distance D of an own vehicle and a preceding vehicle; an inter-vehicle distance arithmetic unit; a follow driving control unit configured to perform control of acceleration or deceleration of the vehicle such that the inter-vehicle distance D coincides with a target inter-vehicle distance Dtr; a camera configured to detect the number of lanes N of a road L; an image processing unit; and a lane number determining unit. The (Continued)

follow driving control unit performs control of acceleration or deceleration at a maximum acceleration or deceleration Gmax according to the number of lanes N.

7 Claims, 6 Drawing Sheets

(56) References Cited

U.S. PATENT DOCUMENTS

| | | | | |
|---|---|---|---|---|
| 2012/0123659 | A1* | 5/2012 | Sato | B60W 30/16 |
| | | | | 701/96 |
| 2012/0265439 | A1* | 10/2012 | Radner | G01C 21/00 |
| | | | | 701/468 |
| 2016/0264003 | A1* | 9/2016 | Yokoyama | B60K 6/52 |
| 2017/0016734 | A1* | 1/2017 | Gupta | G01C 21/3697 |
| 2017/0066443 | A1* | 3/2017 | Kobayashi | B60W 30/16 |

FOREIGN PATENT DOCUMENTS

| | | |
|---|---|---|
| JP | 2010-158924 A | 7/2010 |
| JP | 2010-170396 A | 8/2010 |

* cited by examiner

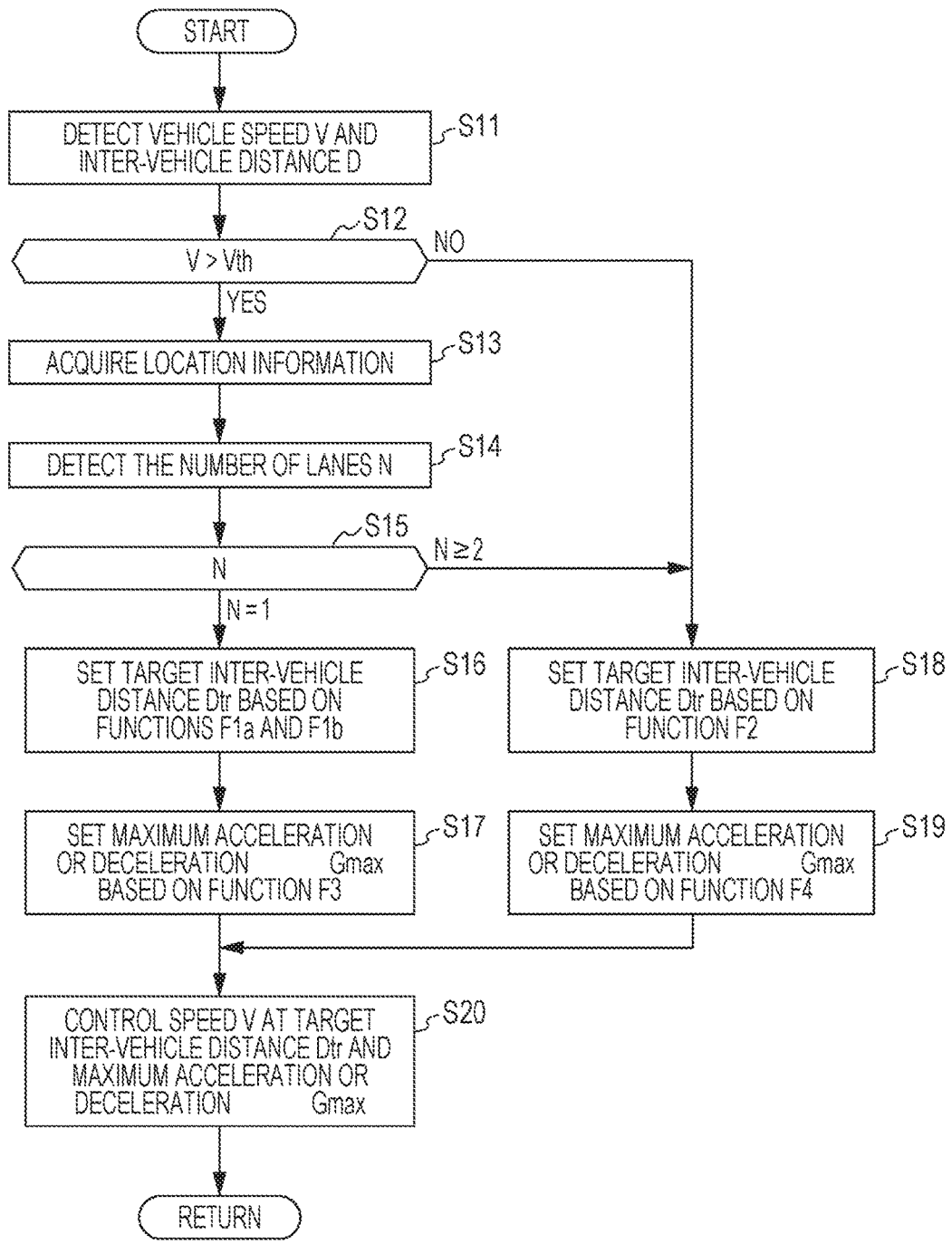

DRIVE CONTROL APPARATUS

CROSS REFERENCES TO RELATED APPLICATIONS

The present application claims priority under 35 U.S.C. § 119 to Japanese Patent Application No. 2015-175810, filed Sep. 7, 2015, entitled "Drive Control Apparatus." The contents of this application are incorporated herein by reference in their entirety.

TECHNICAL FIELD

The present disclosure relates to drive control apparatuses which allow vehicles to follow their preceding vehicles.

BACKGROUND

Vehicles recently developed often have a function to follow preceding vehicles, which is one of a variety of functions to reduce driving loads on drivers. This following function is referred to as adaptive cruise control (ACC). In a vehicle equipped with the ACC, an ACC system including a CPU automatically performs drive control (accelerating and braking operations) of the vehicle such that an inter-vehicle distance D between the vehicle and a preceding vehicle coincides with a target inter-vehicle distance Dtr. Unfortunately, the process of drive control and the timing to execute drive control vary between drivers, and some drivers may feel awkwardness or discomfort to the drive control executed by the ACC system.

Japanese Unexamined Patent Application Publication No. 2004-122823 (claim 6, paragraphs [0030] and [0038], FIGS. 8 to 10) presents the results of research showing that drivers feel an appropriate inter-vehicle distance D as short when the number of lanes N is small. Based on these results, the control apparatus according to Japanese Unexamined Patent Application Publication No. 2004-122823 increases the target inter-vehicle distance Dtr as the number of lanes N is reduced. Specifically, the control apparatus according to Japanese Unexamined Patent Application Publication No. 2004-122823 acquires information on the number of lanes on a road using a navigation system. Drive control is executed such that a first target inter-vehicle distance Dtr 1 is attained, if a road has three or more lanes in each direction. If the road has two lanes in each direction, the first target inter-vehicle distance Dtr 1 is multiplied by a first gain (>1) according to the vehicle speed to determine a second target inter-vehicle distance Dtr 2, and drive control is executed such that the second target inter-vehicle distance Dtr 2 is attained. If the road has one lane in each direction, the first target inter-vehicle distance Dtr is multiplied by a second gain according to the vehicle speed (>first gain) to determine a third target inter-vehicle distance Dtr 3, and drive control is executed such that the third target inter-vehicle distance Dtr 3 is attained.

The control apparatus according to Japanese Unexamined Patent Application Publication No. 2004-122823 enables control of the inter-vehicle distance according to the number of lanes N without giving awkwardness or discomfort to the drivers. In contrast, the control apparatus according to Japanese Unexamined Patent Application Publication No. 2004-122823 executes control of acceleration or deceleration in a fixed manner irrespective of the number of lanes N. Such control of acceleration or deceleration may cause giving awkwardness or discomfort to the drivers.

For example, if the vehicle is driving on a multiple-lane road having multiple lanes in each direction (N≥2), an inter-vehicle distance D between the vehicle and the preceding vehicle larger than the target inter-vehicle distance Dtr readily allows cut-in by another vehicle in front of the own vehicle. Drivers who do not want such cut-in want quick return of the inter-vehicle distance D to the target inter-vehicle distance Dtr if the inter-vehicle distance D with the preceding vehicle is larger than the target inter-vehicle distance Dtr during driving on a multiple-lane road. In contrast, cut-in by another vehicle does not occur when the vehicle is driving on a single-lane road having a single lane in each direction (N=1). Accordingly, the drivers desire control of acceleration or deceleration with sufficient allowance.

SUMMARY

The present disclosure has been made in consideration of such problems. It is desirable to provide a drive control apparatus which allows control of acceleration or deceleration according to the number of lane without giving awkwardness or discomfort to drivers.

The present disclosure provides a drive control apparatus including: an inter-vehicle distance detecting unit that detects an inter-vehicle distance between a vehicle and a preceding vehicle; a follow driving control unit that performs control of acceleration or deceleration of the vehicle such that the inter-vehicle distance coincides with a target inter-vehicle distance; and a lane number detecting unit that detects the number of lanes of a road on which the vehicle is driving, wherein the follow driving control unit performs control of acceleration or deceleration with a control amount according to the number of lanes. The present disclosure can perform control of acceleration or deceleration suitable for the number of lanes because control of acceleration or deceleration is performed by the control amount according to the number of lanes.

For example, in the present disclosure, the control amount on a road having a small number of lanes can also be made smaller than that on a road having a large number of lanes. Roads having a large number of lanes increase the possibility of cut-in by another vehicle between the vehicle and its preceding vehicle. Roads having a small number of lanes decrease the possibility of cut-in by another vehicle between the vehicle and its preceding vehicle. In particular, such cut-in by another vehicle between the vehicle and its preceding vehicle never occurs in a single-lane road having a single lane in each direction. The drive control apparatus of this disclosure, for example, enables a vehicle to follow its preceding vehicle with sufficient allowance because the control amount in control of acceleration or deceleration is reduced if the number of lanes is small, that is, cut-in by another vehicle between the vehicle and its preceding vehicle is low.

For example, in the present disclosure, the target inter-vehicle distance on a road having a small number of lanes can also be made larger than that on a road having a large number of lanes. The drive control apparatus of this disclosure increases the target inter-vehicle distance if the number of lanes is small, that is, cut-in by another vehicle between the vehicle and its preceding vehicle is of small possibility, and reduces the control amount in control of acceleration or deceleration. For this reason, acceleration or deceleration beyond necessity can be prevented even when the preceding vehicle suddenly changes its behavior.

The drive control apparatus of this disclosure may further include a vehicle speed detecting unit that detects the vehicle speed of the vehicle. In this case, the follow driving control unit preferably performs control of acceleration or deceleration with a first control amount if the vehicle speed is more than a predetermined vehicle speed and the number of lanes is less than a predetermined value, and performs control of acceleration or deceleration with a second control amount if the vehicle speed is the predetermined vehicle speed or less or the number of lanes is the predetermined value or more. For example, the drive control apparatus of this disclosure can perform control of acceleration or deceleration with high response in circumstances where the vehicle speed is reduced, such as traffic jams. Such control of acceleration or deceleration allows the vehicle to follow its preceding vehicle in traffic jams without delay of acceleration or deceleration.

For example, the drive control apparatus according to the present disclosure can perform control of acceleration or deceleration suitable for the number of lanes because control of acceleration or deceleration is performed based on the control amount according to the number of lanes.

BRIEF DESCRIPTION OF THE DRAWINGS

The advantages of the disclosure will become apparent in the following description taken in conjunction with the following drawings.

FIG. 6 is a flowchart illustrating the processing executed by the drive control apparatus according to the second embodiment.

DETAILED DESCRIPTION

The drive control apparatus of this disclosure will now be described in detail by way of suitable embodiments with reference to the attached drawings. The term "lane markings" used in this specification includes all of objects used to define lanes. Examples thereof include separating lines illustrated in FIGS. 1A and 1B, such as a white solid line WSL, a white broken line WBL, a yellow solid line YSL, and a yellow broken line (not illustrated), and two parallel lines (not illustrated), dot-like structures disposed in rows on road surfaces (not illustrated), such as Botts' dots, cat's eyes, and chatter bars.

[1. First Embodiment]
[1-1. Specific Example of Control of Inter-Vehicle Distance D]

Figure 1A:
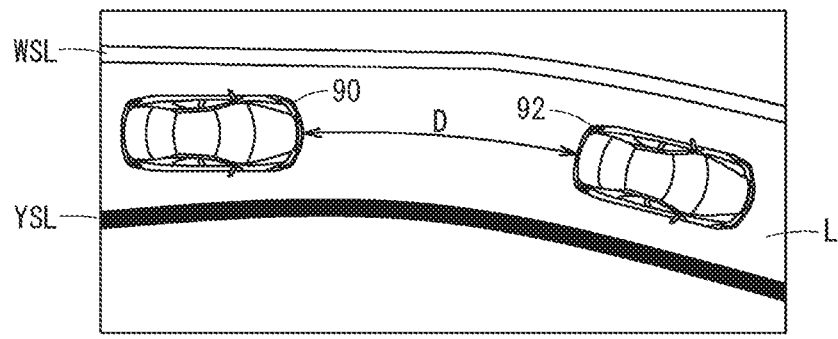
FIG. 1A is a schematic view illustrating an inter-vehicle distance in a single-lane road.
Figure 1B:
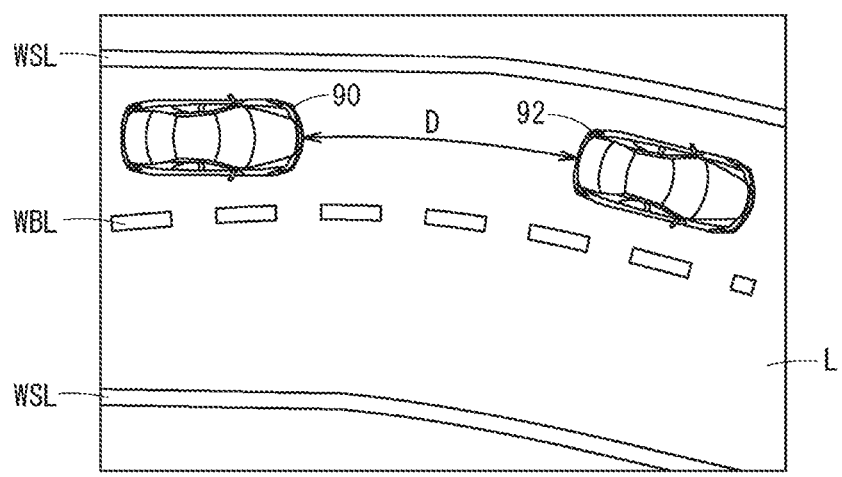
FIG. 1B is a schematic view illustrating an inter-vehicle distance in a multiple-lane road.

In a first embodiment, it is determined whether a road L on which a vehicle 90 is driving is a single-lane road (N=1 in each direction) or a multiple-lane road (N≥2 in each direction). As illustrated in FIG. 1A, if the road L is a single-lane road (N=1 in each direction), the target inter-vehicle distance Dtr is increased so as to increase the inter-vehicle distance D between a vehicle 90 and a preceding vehicle 92, and the maximum acceleration or deceleration Gmax is reduced so as to reduce the acceleration or deceleration G (control amount). As illustrated in FIG. 1B, if the road L is a multiple-lane road (N≥2 in each direction), the target inter-vehicle distance Dtr is reduced so as to reduce the inter-vehicle distance D between the vehicle 90 and the preceding vehicle 92, and the maximum acceleration or deceleration Gmax is increased so as to increase the acceleration or deceleration G (control amount).

[1-2. Configuration of Drive Control Apparatus 10]

Figure 2:
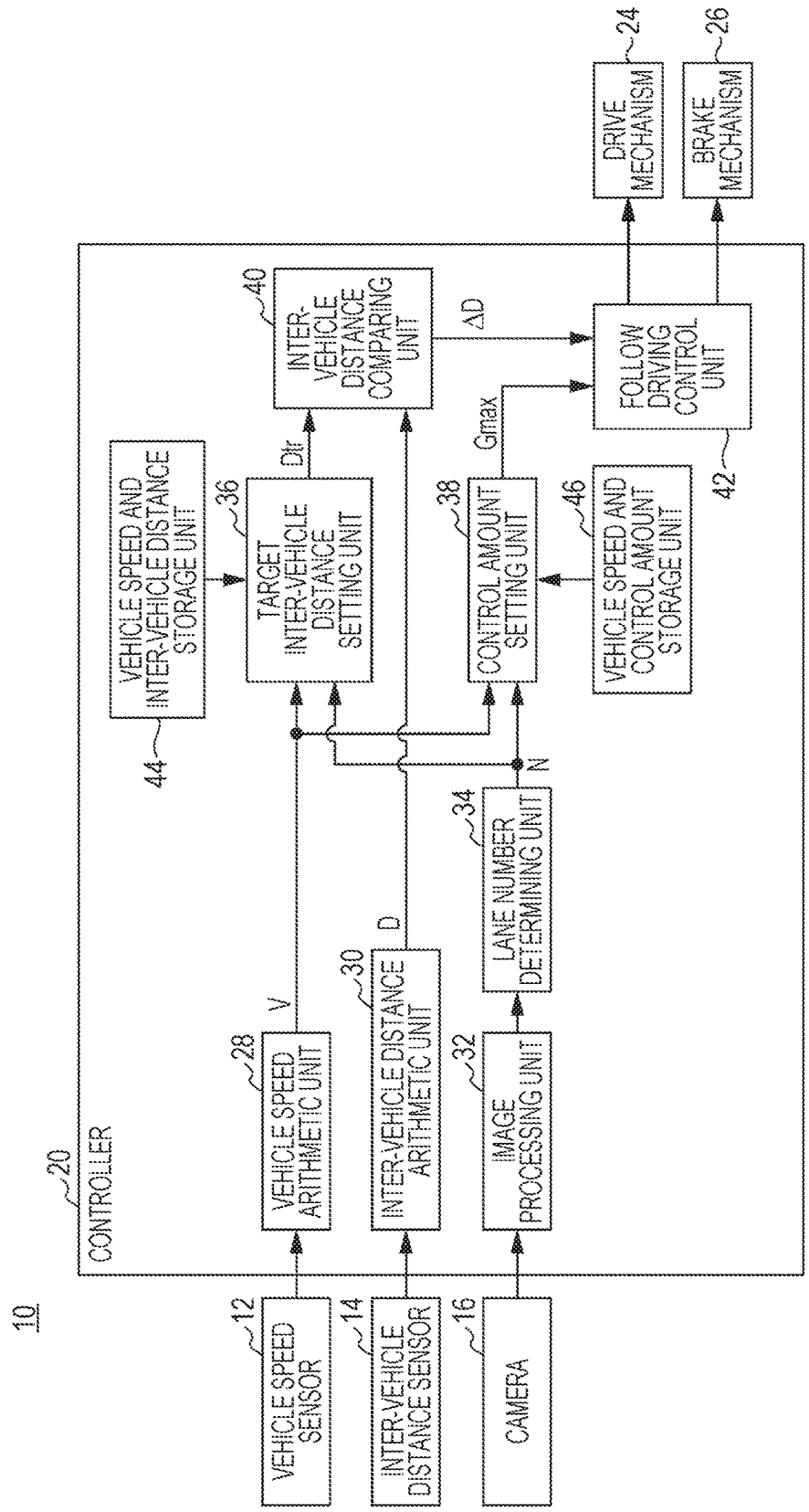
FIG. 2 is a block diagram illustrating an exemplary drive control apparatus according to a first embodiment.

The configuration of the drive control apparatus 10 according to the first embodiment will be described referring to FIG. 2. The drive control apparatus 10 includes a controller 20 that controls driving of the vehicle 90 following the preceding vehicle 92, a vehicle speed sensor 12 that outputs information on a variety of items to the controller 20, an inter-vehicle distance sensor 14, a camera 16, a drive mechanism 24 that operates based on a control instruction output from the controller 20, and a brake mechanism 26.

The vehicle speed sensor 12 is disposed on each of wheels to detect the number of rotations of the wheel or its adjacent axle. The inter-vehicle distance sensor 14 includes a radar such as a millimeter-wave radar, a microwave radar, or a laser radar. The radar is disposed in a front part of the vehicle 90, for example, in a front grille. The radar emits radio waves forwardly from the vehicle 90 to detect the waves reflected from a stereoscopic object (such as the preceding vehicle 92). The inter-vehicle distance sensor 14 used alternative to the radar may be an infrared radiation sensor or a camera. The camera 16 includes a CCD camera. The CCD camera is disposed at or near a rearview mirror. The CCD camera takes images of lane markings and objects ahead of the vehicle 90 to acquire image information.

The controller 20 is configured of an electric control unit (ECU). The ECU is a calculator including a microcomputer. The ECU includes a CPU, a ROM, a RAM, and input/output devices such as an A/D converter and a D/A converter. The ECU functions as function implementing units 28, 30, 32, 34, 36, 38, 40, and 42 through execution of programs stored in the ROM by the CPU. The controller 20 also includes a vehicle speed and inter-vehicle distance storage unit 44 that stores the setting value of the target inter-vehicle distance Dtr corresponding to the vehicle speed V, and a vehicle speed and control amount storage unit 46 that stores the setting value of the maximum acceleration or deceleration Gmax corresponding to the vehicle speed V. The ECU may be divided into several units, or may be integrated with another ECU. The controller 20 can also be formed with an analog circuit.

The vehicle speed arithmetic unit 28 is configured so as to calculate the vehicle speed V of the vehicle 90 based on signals detected by the vehicle speed sensor 12. The inter-vehicle distance arithmetic unit 30 is configured so as to calculate the inter-vehicle distance D between the vehicle 90 and the preceding vehicle 92 from the difference of time from emission of the radio waves from the inter-vehicle distance sensor 14 to detection of the reflected waves.

The image processing unit 32 is configured so as to perform image processing based on the image information acquired by the camera 16, and detect the lane markings. For example, when the lane marking is a solid line or a broken line, the image processing unit 32 performs differential processing based on the image information (original image) acquired by the camera 16 to extract the edge of the lane marking. Then, the image processing unit 32 performs Hough transform to detect the solid line or the broken line. The image processing unit 32 performs morphological operation if the lane marking is a structure such as Botts' dots. The techniques of detecting the lane markings by image processing are known as disclosed in Japanese Unexamined Patent Application Publication No. 2010-170396, for example. Different image processing enabling detection of the lane markings may also be used.

The lane number determining unit 34 is configured so as to detect the number of lanes N of the road L on which the vehicle 90 is driving, based on the lane markings detected by the image processing unit 32. One of the method of detecting the number of lanes N may be counting the number of lanes N defined by the lane markings detected by the image processing unit 32. In the present embodiment, it is determined whether the road L is a single-lane road (N=1 in each direction) or a multiple-lane road (N≥2 in each direction). Whether the road L is a single-lane road or a multiple-lane road may be determined through determination of the types of the lane markings. For example, it can be determined whether a lane marking is a partition line or a structure and whether the partition line is a solid line or a broken line and a white line or a yellow line, and can be inferred based on the results of determination whether the road L is a single-lane road (N=1) or a multiple-lane road (N≥2). As one of specific examples, it can be determined and inferred that the road L is a single-lane road if the lane marking to the right of the vehicle 90 is a yellow solid line YSL and the lane marking to the left of the vehicle 90 is a white solid line WSL, as illustrated in FIG. 1A.

The target inter-vehicle distance setting unit 36 is configured so as to set the target inter-vehicle distance Dtr based on the vehicle speed V calculated by the vehicle speed arithmetic unit 28, the number of lanes N detected by the lane number determining unit 34, and functions F1$a$ and F1$b$ or a function F2 (see FIG. 3A) stored in the vehicle speed and inter-vehicle distance storage unit 44. Furthermore, the target inter-vehicle distance setting unit 36 is configured so as to set the target inter-vehicle distance Dtr based on the function F2 as the initial setting at the start of follow drive control.

The control amount setting unit 38 is configured so as to set the maximum acceleration or deceleration Gmax based on the vehicle speed V calculated by the vehicle speed arithmetic unit 28, the number of lanes N detected by the lane number determining unit 34, and a function F3 or a function F4 (see FIG. 3B) stored in the vehicle speed and control amount storage unit 46. Furthermore, the control amount setting unit 38 is configured so as to set the maximum acceleration or deceleration Gmax based on the function F4 as the initial setting at the start of follow drive control.

The inter-vehicle distance comparing unit 40 is configured so as to calculate the difference ΔD between the inter-vehicle distance D calculated by the inter-vehicle distance arithmetic unit 30 and the target inter-vehicle distance Dtr set by the target inter-vehicle distance setting unit 36. For example, the inter-vehicle distance D is subtracted from the target inter-vehicle distance Dtr. If the inter-vehicle distance D is larger than the target inter-vehicle distance Dtr, that is, the vehicle 90 is far from the preceding vehicle 92, the difference ΔD (=Dtr−D) has a negative value. In contrast, if the inter-vehicle distance D is smaller than the target inter-vehicle distance Dtr, that is, the vehicle 90 is close to the preceding vehicle 92, the difference ΔD (=Dtr−D) has a positive value.

The follow driving control unit 42 is configured so as to output an acceleration instruction to the drive mechanism 24 or a deceleration instruction to the brake mechanism 26 based on the vehicle speed V, the maximum acceleration or deceleration Gmax, and the difference ΔD. If the difference ΔD (=Dtr−D) is a negative value, an instruction to accelerate at the maximum acceleration Gmax is output to the drive mechanism 24 to cause the vehicle 90 to approach the preceding vehicle 92. If the difference ΔD (=Dtr−D) is a positive value, an instruction to decelerate at the maximum deceleration Gmax is output to the drive mechanism 24 to space the vehicle 90 from the preceding vehicle 92.

Figure 3A:
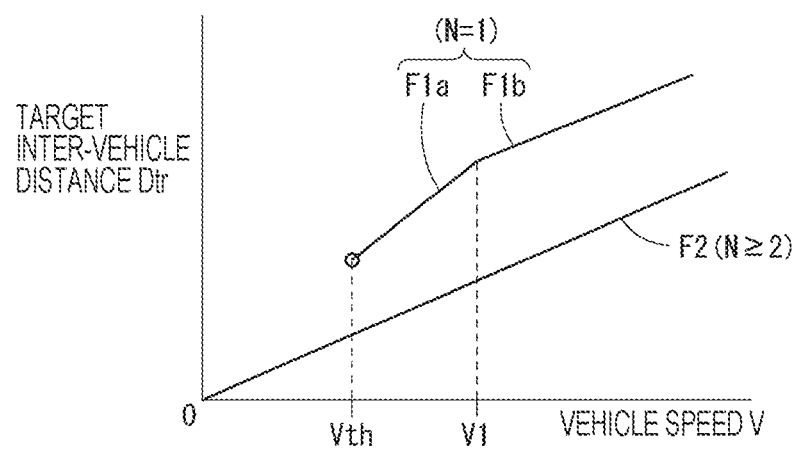
FIG. 3A is a diagram for illustrating a function of a vehicle speed-target inter-vehicle distance used in the drive control apparatus.

The vehicle speed and inter-vehicle distance storage unit 44 stores the setting value of the target inter-vehicle distance Dtr corresponding to the vehicle speed V for each number of lanes N. For example, as illustrated in FIG. 3A, the vehicle speed and inter-vehicle distance storage unit 44 stores functions F1$a$ and F1$b$ indicating the correspondence relationship between the vehicle speed V and the target inter-vehicle distance Dtr when the number of lanes N=1 (single-lane road). The vehicle speed and inter-vehicle distance storage unit 44 stores a function F2 indicating the correspondence relationship between the vehicle speed V and the target inter-vehicle distance Dtr when the number of lanes N≥2 in each direction (multiple-lane road). The function F1$a$ is a linear function indicating the relationship between the vehicle speed V greater than a vehicle speed threshold Vth and the vehicle speed V1 or less and the target inter-vehicle distance Dtr. The function F1$b$ is a linear function indicating the relationship between the vehicle speed V greater than the vehicle speed V1 and the target inter-vehicle distance Dtr. The function F2 is a linear function indicating the relationship between the vehicle speed V greater than the vehicle speed 0 and the target inter-vehicle distance Dtr. Comparing the target inter-vehicle distance Dtr corresponding to any vehicle speed V (>Vth) between the functions F1$a$ and F1$b$ and the function F2, the target inter-vehicle distance Dtr of the functions F1$a$ and F1$b$ is larger than the target inter-vehicle distance Dtr of the function F2. In the present embodiment, thus, when the number of lanes N is small (N=1), the target inter-vehicle distance Dtr is increased compared to the case where the number of lanes N is large (N≥2). The setting value of the target inter-vehicle distance Dtr corresponding to the vehicle speed V may also be stored in a table, rather than the functions F1$a$, F1$b$, and F2.

Figure 3B:
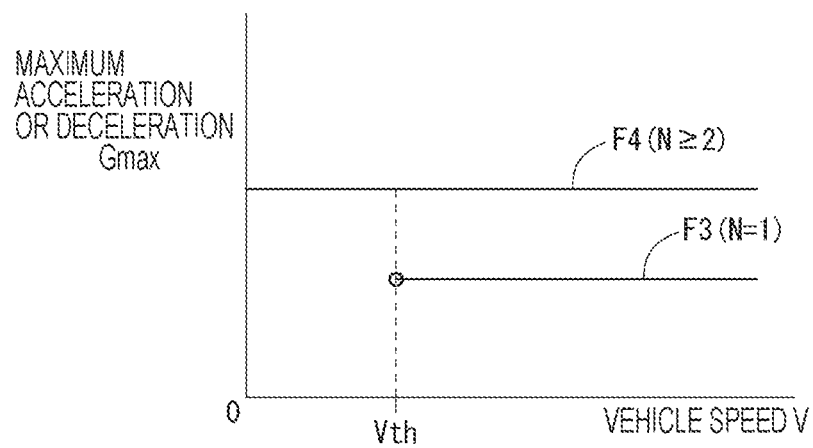
FIG. 3B is a diagram for illustrating a function of vehicle speed-maximum acceleration or deceleration used in the drive control apparatus.

The vehicle speed and control amount storage unit 46 stores the setting value of the maximum acceleration or deceleration Gmax corresponding to the vehicle speed V for each number of lanes N. For example, as illustrated in FIG. 3B, the vehicle speed and control amount storage unit 46 stores a function F3 indicating the correspondence relationship between the vehicle speed V and the maximum acceleration or deceleration Gmax when the number of lanes N=1 in each direction (single-lane road). The vehicle speed and control amount storage unit 46 also stores a function F4 indicating the correspondence relationship between the vehicle speed V and the maximum acceleration or deceleration Gmax when the number of lanes N≥2 in each direction (multiple-lane road). The function F3 is a constant function indicating the relationship between the vehicle speed V greater than the vehicle speed threshold Vth and the maximum acceleration or deceleration Gmax. The function F4 is a constant function indicating the relationship between the vehicle speed V greater than the vehicle speed 0 and the maximum acceleration or deceleration Gmax. The maximum acceleration or deceleration Gmax corresponding to any vehicle speed V (>Vth) in the function F3 is smaller than that in the function F4. In the present embodiment, thus, when the number of lanes N is small (N=1), the maximum acceleration or deceleration (control amount) Gmax is reduced compared to the case where the number of lanes N is large (N≥2). The setting value of the maximum acceleration or deceleration Gmax corresponding to the vehicle speed V may also be stored as a table rather than the functions F3 and F4.

The drive mechanism 24 includes a driving source of the vehicle 90 such as an engine and/or an electric motor, and peripheral apparatuses controlling the driving source. Examples thereof include an actuator controlling open/close of the throttle valve according to the acceleration instruction output from the controller 20, and an electric circuit controlling the electric motor according to the acceleration instruction output from the controller 20.

The brake mechanism 26 includes brakes disposed in wheels and peripheral apparatuses controlling the respective brakes. Examples thereof include a brake actuator controlling the pressure of the brake fluid according to the deceleration instruction output from the controller 20.

[1-3. Processing of Drive Control Apparatus 10]

The processing executed by the drive control apparatus 10 while the vehicle is driving will be described using FIG. 4. If a driver turns on an activation switch for executing follow drive (not illustrated), the drive control apparatus 10 starts follow drive control. At the start of follow drive control, the target inter-vehicle distance Dtr is set based on the function F2, and the maximum acceleration or deceleration Gmax is set based on the function F4.

In Step S1, the vehicle speed arithmetic unit 28 detects the vehicle speed V of the vehicle 90 based on the detection signals output from the vehicle speed sensor 12. The inter-vehicle distance arithmetic unit 30 detects the inter-vehicle distance D between the vehicle 90 and the preceding vehicle 92 based on the detection signals output from the inter-vehicle distance sensor 14.

In Step S2, the vehicle speed arithmetic unit 28 compares the vehicle speed V and the predetermined vehicle speed threshold Vth. If the vehicle speed V is greater than the vehicle speed threshold Vth (Step S2: YES), the number of lanes N should be detected. Then, the processing goes to Step S3. If the vehicle speed V is the vehicle speed threshold Vth or less (Step S2: NO), the processing goes to Step S8.

In Step S3, the camera 16 takes images in front of the vehicle 90 to acquire image information, and outputs the image information to the controller 20. The image processing unit 32 performs image processing to detect the lane markings from the images represented by the image information.

In Step S4, the lane number determining unit 34 detects the number of lanes N of the road L on which the vehicle 90 is driving. At this time, as described above, the number of lanes N defined by the lane markings in the image represented by the image information may be counted, or the number of lanes N may be inferred through determination of the type of the lane marking.

In Step S5, the lane number determining unit 34 determines the number of lanes N. If the road L is a single-lane road) (Step S5: N=1), the processing goes to Step S6. If the road L is a multiple-lane road (Step S5: N≥2), the processing goes to Step S8.

As above, if the vehicle speed V is greater than the vehicle speed threshold Vth (Step S2: YES) and the road L is a single-lane road (Step S5: N=1), the target inter-vehicle distance Dtr and the maximum acceleration or deceleration Gmax are set in Step S6 and Step S7 below.

In Step S6, the target inter-vehicle distance setting unit 36 sets the target inter-vehicle distance Dtr according to the vehicle speed V. Here, the target inter-vehicle distance Dtr is set based on the function F1a or F1b (see FIG. 3A) because the vehicle speed V is greater than the vehicle speed threshold Vth (Step S2: YES) and the road L is a single-lane road (Step S5: N=1).

In Step S7, the control amount setting unit 38 sets the maximum acceleration or deceleration Gmax according to the vehicle speed V. Here, the maximum acceleration or deceleration Gmax is set based on the function F3 (FIG. 3B) because the vehicle speed V is greater than the vehicle speed threshold Vth (Step S2: YES) and the road L is a single-lane road (Step S5: N=1). If Step S7 is completed, the processing goes to Step S10.

If the vehicle speed V is the vehicle speed threshold Vth or less (Step S2: NO) or the road L is a multiple-lane road (Step S5: N≥2), the target inter-vehicle distance Dtr and the maximum acceleration or deceleration Gmax are set in Step S8 and Step S9 below.

In Step S8, the target inter-vehicle distance setting unit 36 sets the target inter-vehicle distance Dtr according to the vehicle speed V. Here, the target inter-vehicle distance Dtr is set based on the function F2 (see FIG. 3A) because the vehicle speed V is the vehicle speed threshold Vth or less (Step S2: NO) or the road L is a multiple-lane road (Step S5: N≥2).

In Step S9, the control amount setting unit 38 sets the maximum acceleration or deceleration Gmax according to the vehicle speed V. Here, the maximum acceleration or deceleration Gmax is set based on the function F4 (see FIG. 3B) because the vehicle speed V is the vehicle speed threshold Vth or less (Step S2: NO) or the road L is a multiple-lane road (Step S5: N≥2). If Step S9 is completed, the processing goes to Step S10.

In Step S10, the follow driving control unit 42 controls the vehicle speed V at the target inter-vehicle distance Dtr and the maximum acceleration or deceleration Gmax. Here, first, the inter-vehicle distance comparing unit 40 compares the target inter-vehicle distance Dtr and the actual inter-vehicle distance D, and determines the difference $\Delta D$ (=Dtr−D). Next, the follow driving control unit 42 controls the vehicle speed V such that the difference $\Delta D$ is close to zero. If the difference $\Delta D$ (=Dtr−D) is a negative value, the vehicle 90 is positioned away from the preceding vehicle 92 by a distance greater than the target inter-vehicle distance Dtr. In order to cause the vehicle 90 to approach the preceding vehicle 92, the follow driving control unit 42 outputs an instruction to accelerate at the maximum acceleration Gmax to the drive mechanism 24. Then, the drive mechanism 24 performs an acceleration operation at the upper limit of the acceleration G as the maximum acceleration Gmax. If the difference $\Delta D$ (=Dtr−D) is a positive value, the vehicle 90 is positioned away from the preceding vehicle 92 by a distance smaller than the target inter-vehicle distance Dtr. In order to drive the vehicle 90 further away from the preceding vehicle 92, the follow driving control unit 42 outputs an instruction to decelerate at the maximum deceleration Gmax to the brake mechanism 26. Then, the brake mechanism 26 performs a deceleration operation at the upper limit of the deceleration G as the maximum deceleration Gmax.

The target inter-vehicle distance Dtr and the maximum acceleration or deceleration Gmax may be changed immediately when the switch condition is satisfied (when a change from the single-lane road to the multiple-lane road or vice versa is detected). Alternatively, the target inter-vehicle distance Dtr and the maximum acceleration or deceleration Gmax may be gradually changed according to the current vehicle speed V (or target speed) after a predetermined time when the switch condition is satisfied. The target inter-vehicle distance Dtr and the maximum acceleration or deceleration Gmax may be gradually changed according to the difference between inter-vehicle distance D (or the difference in target inter-vehicle distance Dtr) before and after the switch condition is satisfied and the current vehicle speed V (or target speed).

[1-4. Summary of First Embodiment]

The drive control apparatus 10 includes the inter-vehicle distance sensor 14 that detects the inter-vehicle distance D between the vehicle 90 and the preceding vehicle 92, and the inter-vehicle distance arithmetic unit 30 (inter-vehicle distance detecting unit), the follow driving control unit 42 that performs control of acceleration or deceleration of the vehicle 90 such that the inter-vehicle distance D coincides with the target inter-vehicle distance Dtr, the camera 16 that detects the number of lanes N of the road L, the image processing unit 32, and the lane number determining unit 34 (lane number detecting unit). The follow driving control unit 42 is configured so as to perform control of acceleration or deceleration at the maximum acceleration or deceleration Gmax (control amount) according to the number of lanes N. Such a drive control apparatus 10 performs control of acceleration or deceleration at the maximum acceleration or deceleration Gmax according to the number of lanes N, and thus can control of acceleration or deceleration suitable for the number of lanes N. In such control of acceleration or deceleration, drivers do not feel deviation between acceleration or deceleration and the number of lanes N.

The drive control apparatus 10 also includes the vehicle speed sensor 12 that detects the vehicle speed V of the vehicle 90, and the vehicle speed arithmetic unit 28 (vehicle speed detecting unit). The follow driving control unit 42 performs control of acceleration or deceleration at the maximum acceleration or deceleration Gmax (first control amount) set based on the function F3 if the vehicle speed V is greater than the vehicle speed threshold Vth and the road L is a single-lane road (N=1). The follow driving control unit 42 performs control of acceleration or deceleration at the maximum acceleration or deceleration Gmax (second control amount) set based on the function F4 if the vehicle speed V is the vehicle speed threshold Vth or less or the road L is a multiple-lane road (N≥2). Such a drive control apparatus 10 can perform control of acceleration or deceleration with good response in situations where the vehicle speed V is reduced, such as traffic jams. Such control of acceleration or deceleration allows the vehicle to follow its preceding vehicle in traffic jams without delay of acceleration or deceleration.

[2. Second Embodiment]

The drive control apparatus 10a according to a second embodiment will be described using FIGS. 5 and 6. Many features of the drive control apparatus 10a are common to those of the drive control apparatus 10 according the first embodiment. For this reason, in the drive control apparatus 10a, differences from the drive control apparatus 10 will be described, and description of those common features will be omitted.

Figure 5:
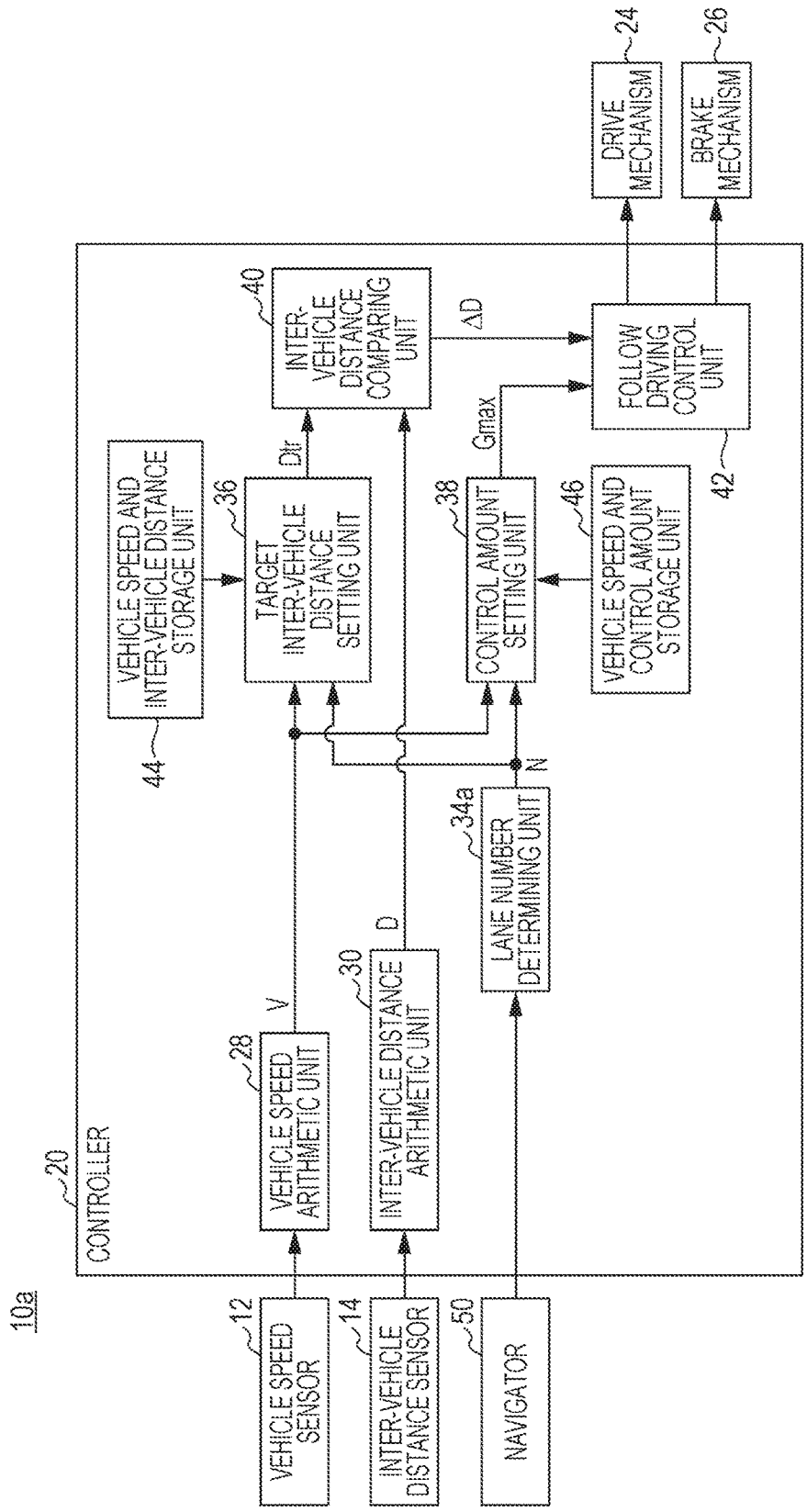
FIG. 5 is a block diagram illustrating an exemplary drive control apparatus according to a second embodiment.

As illustrated in FIG. 5, the drive control apparatus 10a includes a navigator 50, rather than the camera 16 and the image processing unit 32 in the drive control apparatus 10. The navigator 50 includes a GPS antenna, a GPS receiver, an acceleration speed sensor, a gyroscope, an azimuth sensor, a computer for navigation, and map information. The navigator 50 receives vehicle speed signals input from the vehicle speed sensor 12. Furthermore, the navigator 50 includes a display displaying route guidance information, and a speaker providing the route guidance information as an audio output. The navigator 50 measures the position of the vehicle 90, and acquires the location information including the information on the number of lanes N.

The lane number determining unit 34a is configured so as to detect the number of lanes N of a road L on which the vehicle 90 is driving, based on the location information output from the navigator 50.

Figure 4:
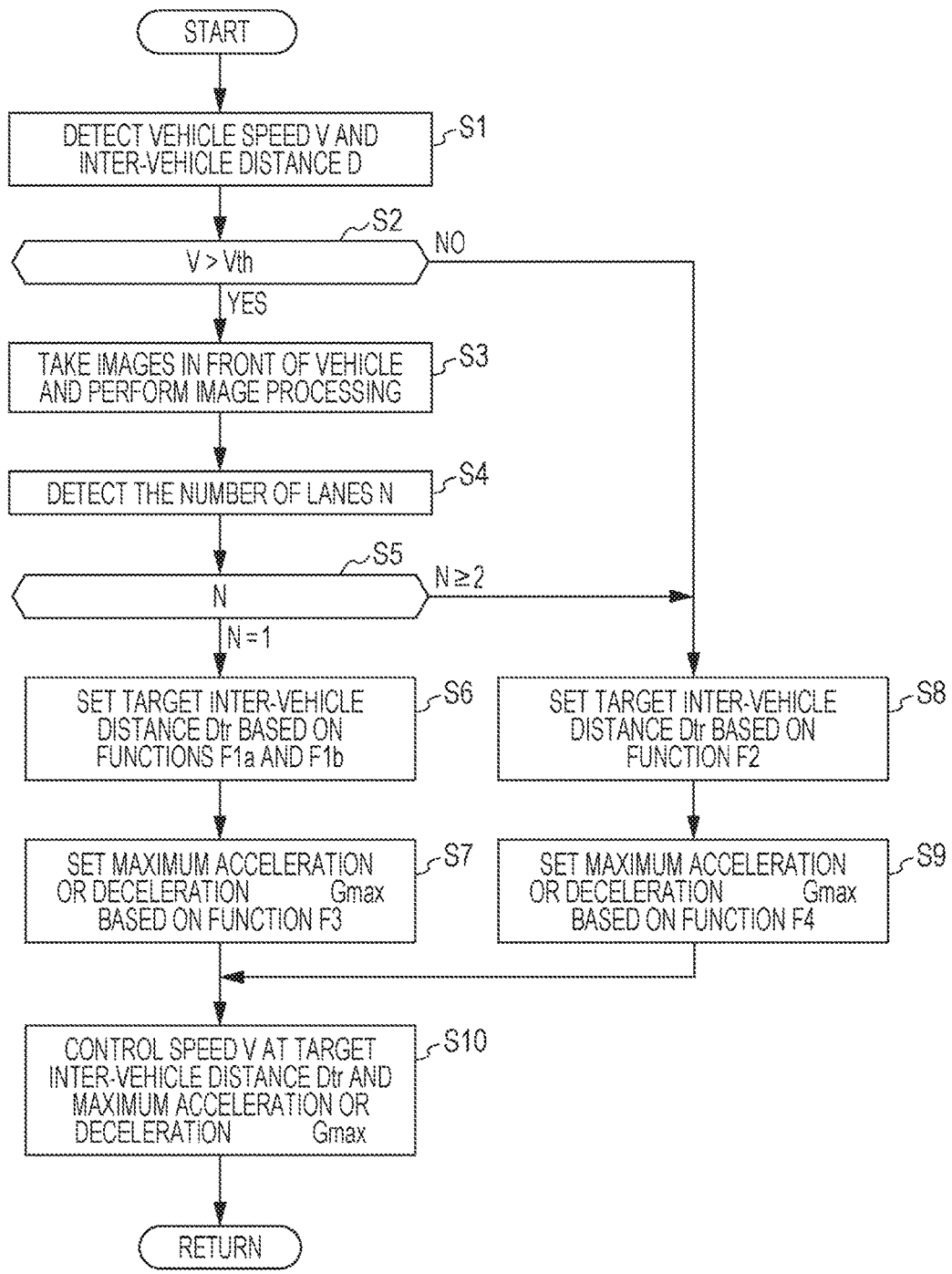
FIG. 4 is a flowchart illustrating the processing executed by the drive control apparatus according to the first embodiment.

As illustrated in FIG. 6, most of the flowchart of the second embodiment is similar to that of the first embodiment illustrated in FIG. 4. However, different processings are performed in Step S13 and Step S14.

In Step S13, the navigator 50 measures the position of the vehicle 90 to acquire the location information, and outputs the location information including the information on the number of lanes N to the controller 20. In Step S14, the lane number determining unit 34a detects the number of lanes N of a road L on which the vehicle 90 is driving, based on the location information.

The drive control apparatus according to the second embodiment also provides the same effect as that of the first embodiment. Although the drive control apparatus according to the first embodiment cannot detect the number of lanes N on roads where lane markings are missing, the drive control apparatus according to the second embodiment can detect the number of lanes N irrespective of whether the lane markings are missing or not.

The drive control apparatus according to the second embodiment can also use a receiver terminal acquiring the information on the number of lanes N from the outside, rather than the navigator 50. For example, the number of lanes N may be acquired using a terminal device (beacon unit) acquiring the information provided from an information providing system such as the Vehicle Information Communication System (VICS) (Registered Trademark).

[3. Third Embodiment]

In the first and second embodiments, the target inter-vehicle distance Dtr and the maximum acceleration or deceleration Gmax are changed according to the single-lane road (N=1 in each direction) or the multiple-lane road (N≥2 in each direction). The number of lanes N is not limited to these in the present embodiment; the target inter-vehicle distance Dtr and the maximum acceleration or deceleration Gmax can also be changed according to the number of lanes N if the road L has three or more lanes in each direction.

In the third embodiment, the maximum acceleration or deceleration Gmax at an x lane (where x is a natural number of 1 or more) is made smaller than the maximum acceleration or deceleration Gmax at an x+1 lane. In other words, the maximum acceleration or deceleration Gmax (control amount) is made smaller at a smaller number of lanes N than at a larger number of lanes N.

In the third embodiment, the target inter-vehicle distance Dtr at an x lane (where x is a natural number of 1 or more) is made greater than that at an x+1 lane. In other words, the target inter-vehicle distance Dtr is made larger at a smaller number of lanes N than that at a larger number of lanes N.

Roads having a large number of lanes N increase the possibility of cut-in by another vehicle between the vehicle 90 and the preceding vehicle 92. In contrast, roads having a small number of lanes N decreases the possibility of cut-in of another vehicle between the vehicle 90 and the preceding vehicle 92. The drive control apparatus according to the third embodiment enables the vehicle 90 to follow the preceding vehicle 92 with sufficient allowance because the control amount in control of acceleration or deceleration is reduced if the number of lanes is small, that is, cut-in by another vehicle between the vehicle and its preceding vehicle is low. Moreover, acceleration or deceleration beyond necessity can be prevented even when the preceding vehicle 92 suddenly changes its behavior.

[4. Fourth Embodiment]

In the first to third embodiments, at a small number of lanes N, the maximum acceleration or deceleration Gmax is reduced while the target inter-vehicle distance Dtr is increased; at a large number of lanes N, the maximum acceleration or deceleration Gmax is increased while the target inter-vehicle distance Dtr is reduced. In contrast, in the fourth embodiment, the maximum acceleration or deceleration Gmax is increased at a small number of lanes N, and the maximum acceleration or deceleration Gmax is reduced at a large number of lanes N. The target inter-vehicle distance Dtr may be reduced at a small number of lanes N, and the target inter-vehicle distance Dtr may be increased at a large number of lanes N.

The feelings of drivers to the relationship between the number of lanes N, the acceleration or deceleration G, and the inter-vehicle distance D may be varied according to regional differences. To reflect such variations, the directions and/or the amounts in change of the number of lanes N and the maximum acceleration or deceleration Gmax can be determined according to such regional differences of driving feelings. Similarly, the directions and/or the amounts in change of the number of lanes N and the target inter-vehicle distance Dtr can be determined according to such regional differences of driving feelings.

[5. Fifth Embodiment]

The drive control apparatuses according to the first to fourth embodiments perform control of acceleration or deceleration at the maximum acceleration or deceleration Gmax according to the number of lanes N. The drive control apparatus according to the present embodiment performs control of acceleration or deceleration at a control amount according to the number of lanes N. In other words, a control amount different from the maximum acceleration or deceleration Gmax may be changed according to the number of lanes N.

For example, the temporal amount in change (change rate) of the acceleration or deceleration may be increased at a small number of lanes N, and the temporal amount in change of the acceleration or deceleration G may be reduced at a large number of lanes N. Conversely, the temporal amount in change of the acceleration or deceleration G may be reduced at a small number of lanes N, and the temporal amount in change of the acceleration or deceleration G may be increased at a large number of lanes N. An increase in the temporal amount in change of the acceleration G enables quick acceleration; a reduction in the temporal amount in change of the acceleration G enables mild acceleration. An increase in the temporal amount in change of the deceleration G enables quick deceleration; a reduction in the temporal amount in change of the deceleration G enables mild deceleration.

In this case, the vehicle speed and control amount storage unit 46 stores the setting value of the change rate of the acceleration or deceleration G corresponding to the vehicle speed V for each number of lanes N.

In control of acceleration or deceleration with the change rate of the acceleration or deceleration according to the number of lanes N, the change rate may be fixed, or may not be fixed.

[6. Other Embodiments]

Only one of acceleration and deceleration can also be controlled with the control amount according to the number of lanes N. Moreover, the upper limit of the acceleration in control of acceleration can be defined as a maximum acceleration G1max, and the upper limit of the deceleration in control of deceleration can be defined as the maximum deceleration G2max (≠G1max). The embodiments described above can also be combined. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A drive control apparatus comprising:
    an inter-vehicle distance detecting sensor configured to detect an inter-vehicle distance between an own vehicle and a preceding vehicle;
    a follow driving control unit configured to perform control of acceleration or deceleration of the own vehicle such that the inter-vehicle distance becomes equal to a target inter-vehicle distance;
    a lane number detecting unit configured to detect the number of lanes of a road on which the own vehicle is driving; and
    a vehicle speed detecting sensor configured to detect a vehicle speed of the own vehicle, wherein
    the follow driving control unit performs the control of acceleration or deceleration with a control amount according to the detected number of lanes,
    wherein the follow driving control unit performs the control of acceleration or deceleration with a first control amount when the vehicle speed is more than a predetermined threshold vehicle speed and the number of lanes is less than a predetermined number of lanes, and performs the control of acceleration or deceleration with a second control amount when the vehicle speed is equal to or less than the predetermined threshold vehicle speed or the number of lanes is equal to or more than the predetermined number of lanes, and
    wherein the first control amount is smaller than the second control amount.

2. The drive control apparatus according to claim 1, wherein as the detected number of lanes is smaller, the follow driving control unit makes the control amount smaller than that when the number of lanes is larger.

3. The drive control apparatus according to claim 2, wherein as the detected number of lanes is smaller, the target inter-vehicle distance is made larger than that when the number of lanes is larger.

4. The drive control apparatus according to claim 1, wherein the follow driving control unit varies the acceleration or the deceleration in accordance with the detected number of lanes.

5. The drive control apparatus according to claim 1, wherein the follow driving control unit is configured to set a maximum acceleration or a maximum deceleration based on a function as an initial setting at start time of a follow drive control, the function indicating correspondence relationship between the maximum acceleration or the maximum deceleration and the vehicle speed in a case where the road includes multiple lanes.

6. A drive control apparatus comprising:
an inter-vehicle distance detecting sensor configured to detect an inter-vehicle distance between an own vehicle and a preceding vehicle;
a follow driving controller configured to perform control of acceleration or deceleration of the own vehicle such that the inter-vehicle distance becomes equal to a target inter-vehicle distance;
a lane number detecting ECU (Electric Control Unit) configured to detect the number of lanes of a road on which the own vehicle is driving; and
a vehicle speed detecting sensor configured to detect a vehicle speed of the own vehicle, wherein
the follow driving controller performs the control of acceleration or deceleration with a control amount according to the detected number of lanes,
wherein the follow driving control unit performs the control of acceleration or deceleration with a first control amount when the vehicle speed is more than a predetermined threshold vehicle speed and the number of lanes is less than a predetermined number of lanes, and performs the control of acceleration or deceleration with a second control amount when the vehicle speed is equal to or less than the predetermined threshold vehicle speed or the number of lanes is equal to or more than the predetermined number of lanes, and
wherein the first control amount is smaller than the second control amount.

7. A drive control method comprising steps of:
detecting, by using a sensor, an inter-vehicle distance between an own vehicle and a preceding vehicle;
detecting, by using a computer, the number of lanes of a road on which the own vehicle is driving;
detect a vehicle speed of the own vehicle by using a sensor; and
performing, by using the computer, control of acceleration or deceleration of the own vehicle such that the inter-vehicle distance becomes equal to a target inter-vehicle distance,
wherein
the step of performing performs the control of acceleration or deceleration with a control amount according to the detected number of lanes, and performs the control of acceleration or deceleration with a first control amount when the vehicle speed is more than a predetermined threshold vehicle speed and the number of lanes is less than a predetermined number of lanes, and performs the control of acceleration or deceleration with a second control amount when the vehicle speed is equal to or less than the predetermined threshold vehicle speed or the number of lanes is equal to or more than the predetermined number of lanes, and
wherein the first control amount is smaller than the second control amount.

* * * * *